(12) United States Patent
Bando

(10) Patent No.: US 6,743,890 B2
(45) Date of Patent: Jun. 1, 2004

(54) PROCESS FOR THE PURIFICATION OF POLYARYLENE SULFIDE

(75) Inventor: Toru Bando, Ichihara (JP)

(73) Assignees: Idemitsu Petrochemical Co., Ltd., Tokyo (JP); Petroleum Energy Center(PEC), Tokyo (JP)

( * ) Notice: Subject to any disclaimer, the term of this patent is extended or adjusted under 35 U.S.C. 154(b) by 0 days.

(21) Appl. No.: 10/169,737

(22) PCT Filed: Mar. 21, 2001

(86) PCT No.: PCT/JP01/02225

§ 371 (c)(1),
(2), (4) Date: Jul. 17, 2002

(87) PCT Pub. No.: WO01/70852

PCT Pub. Date: Sep. 27, 2001

(65) Prior Publication Data

US 2003/0027943 A1 Feb. 6, 2003

(30) Foreign Application Priority Data

Mar. 23, 2000 (JP) ......................................... 2000-081104

(51) Int. Cl.[7] .................................................. C08G 6/00
(52) U.S. Cl. ........................ 528/492; 528/388; 528/499; 528/503
(58) Field of Search ................................. 528/388, 492, 528/499, 503

(56) References Cited

U.S. PATENT DOCUMENTS

| | | | |
|---|---|---|---|
| 4,486,578 A | * 12/1984 | Asakura et al. | .............. 525/535 |
| 4,814,430 A | 3/1989 | Iwasaki et al. | |
| 6,388,003 B1 | 5/2002 | Okamoto et al. | |

FOREIGN PATENT DOCUMENTS

| | | |
|---|---|---|
| EP | 0 468 559 | 1/1992 |
| JP | 4-85332 | 3/1992 |
| JP | 8-134216 | 5/1996 |
| JP | 8-337653 | 12/1996 |
| JP | 10-265575 | 10/1998 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

Provided is a method of purifying a polyarylene sulfide by washing it with a mixture of an aprotic organic solvent and an alkyl halide, or with a mixture prepared by adding a halogenoaromatic compound having an electron-withdrawing group to an aprotic organic solvent. The method makes it possible to reduce the impurities such as alkali metal halides in polyarylene sulfide, thus giving thermally stable polyarylene sulfide.

17 Claims, No Drawings

PROCESS FOR THE PURIFICATION OF POLYARYLENE SULFIDE

TECHNICAL FIELD

The present invention relates to a process for purifying polyarylene sulfide (this will be hereinafter abbreviated as PAS) resin. More precisely, the invention relates to a process for purifying PAS resin by efficiently removing impurities such as alkali metal halides existing in the resin, and to thermally stable PAS resin of few impurities.

BACKGROUND OF THE INVENTION

Polyarylene sulfides, especially polyphenylene sulfides are known as stiff engineering plastics of good mechanical strength, good heat resistance and good electric properties, and are widely used for various materials, for example, for parts of electronic and electric appliances.

One general method of producing such PAS heretofore known in the art comprises reacting a dihalogenoaromatic compound such as p-dichlorobenzene with a sodium salt such as sodium sulfide in an aprotic organic solvent such as N-methyl-2-pyrrolidone (this will be hereinafter abbreviated as NMP). In this method, however, the side products, sodium halides are insoluble in the solvent such as NMP and are therefore caught by PAS, and it is not easy to remove them by washing PAS.

On the other hand, in a different method of using a lithium salt in place of the sodium salt for the polymerization, the side products, lithium halides are soluble in many aprotic organic solvents (solvents for polymerization) such as NMP, and it is relatively easy to reduce the lithium content of PAS produced, and the method of using a lithium salt has come into the limelight for PAS production. However, even the method of using a lithium salt for polymerization to give PAS is still problematic in that the side products, lithium halides remain in PAS as impurities therein. In particular, for reducing the remaining monomer in the polymer product PAS so as to increase the molecular weight of PAS and to increase the degree of conversion in polymerization, it is often desired to increase the ratio of Li/S in reacting the lithium salt and the sulfur compound in the method, for example, to at least 2. This has produced another problem in that the excess lithium remains more in the polymer product PAS to further increase the impurities therein.

For removing the impurities such as lithium halides that remain in PAS, one general method is to wash PAS with a solvent such as NMP. However, the process efficiency is not good since the washing frequency inevitably increases with the increase in the impurities existing in the product PAS. In addition, the amount of the washing solvent to be used must be increased, and the production costs thereby increase.

On the other hand, another method of adding ammonium chloride or the like to PAS to remove the impurities such as lithium halides has been proposed. However, this is still problematic in that the thermal stability of PAS obtained therein is not good, and the molecular weight of PAS decreases at high temperatures.

Accordingly, it is desired to develop an efficient method of purifying PAS that enables easy removal of impurities to give thermally stable PAS.

The present invention has been made in consideration of the problems noted above, and its object is to provide a method of purifying PAS which makes it possible to reduce impurities, especially alkali metal halides such as lithium halides in PAS to give thermally stable PAS.

Another object of the invention is to provide thermally stable PAS that contains few alkali metal halides.

DISCLOSURE OF THE INVENTION

I, the present inventor have assiduously studied and, as a result, have found that, when PAS is washed with a mixture of specific compounds (detergent), then the above-mentioned objects can be attained. On the basis of this finding, I have completed the present invention. Specifically, the invention is summarized as follows:

[1] A polyarylene sulfide, which is characterized in that, when it is added to a solvent N-methyl-2-pyrrolidone of the same quantity (by mass) and kept at 265° C. for 8 hours, the reduction in its intrinsic viscosity [$\eta$] at 206° C. is at most 0.05 dl/g.

[2] The polyarylene sulfide of above [1], of which the residual alkali metal content is at most 100 ppm.

[3] A method of purifying a polyarylene sulfide by washing it with a mixture of 100 parts by mass of an aprotic organic solvent and from 0.005 to 10 parts by mass of an alkyl halide.

[4] A method of purifying a polyarylene sulfide by washing it with a mixture of 100 parts by mass of an aprotic organic solvent, from 4 to 60 parts by mass of water, and from 0.05 to 10 parts by mass of an alkyl halide.

[5] The method of purifying a polyarylene sulfide of above [3] or [4], wherein the alkyl halide is a primary alkyl halide.

[6] The method of purifying a polyarylene sulfide of any of above [3] to [5], wherein the alkyl halide is methyl chloride.

[7] A method of purifying a polyarylene sulfide by washing it with a mixture prepared by adding from 0.1 to 10 parts by mass, relative to 100 parts by mass of the polyarylene sulfide, of a halogenoaromatic compound having an electron-withdrawing group to an aprotic organic solvent.

[8] A method of purifying a polyarylene sulfide by washing it with a mixture of 100 parts by mass of an aprotic organic solvent and from 0.005 to 10 parts by mass of a salt prepared through reaction of a strong acid with a weak base, followed by further washing it with a mixture prepared by adding from 0.1 to 10 parts by mass, relative to 100 parts by mass of the polyarylene sulfide, of a halogenoaromatic compound having an electron-withdrawing group to an aprotic organic solvent.

[9] A method of purifying a polyarylene sulfide by washing it with a mixture of 100 parts by mass of an aprotic organic solvent, from 4 to 60 parts by mass of water, and from 0.005 to 10 parts by mass of a salt prepared through reaction of a strong acid with a weak base, followed by further washing it with a mixture prepared by adding from 0.1 to 10 parts by mass, relative to 100 parts by mass of the polyarylene sulfide, of a halogenoaromatic compound having an electron-withdrawing group to an aprotic organic solvent.

[10] The method of purifying a polyarylene sulfide of any of above [7] to [9], wherein the halogenoaromatic compound having an electron-withdrawing group is at least one of 4,4'-dichlorobenzophenone and 4,4'-dichlorodiphenyl sulfone.

BEST MODE FOR CARRYING OUT THE INVENTION

The invention is described concretely hereinunder.

1. Polyarylene Sulfide (PAS)

The polyarylene sulfide (PAS) resin of the invention is characterized in that, when it is added to a solvent N-methyl-2-pyrrolidone of the same quantity (by mass) and kept at 265° C. for 8 hours, the reduction in its intrinsic viscosity [η] at 206° C. is at most 0.05 dl/g, preferably at most 0.03 dl/g, more preferably at most 0.02 dl/g. The resin of the type is thermally stable and bears various severe applications.

For evaluating the thermal stability of resin in the invention, one favorable method comprises keeping a mixture of PAS and NMP at a high temperature (265° C.) for 8 hours and monitoring the change of the intrinsic viscosity [η] of PAS. In this method, the ratio of PAS to NMP is not specifically defined, but for higher reproducibility in the method, in general, the two are mixed in a ratio of 1/1 (by mass), for example, 2.5 g each. In consideration of the solubility of the resin of the type, it is advantageous that the intrinsic viscosity [η] of the resin is measured and expressed at 206° C.

In addition to its thermal stability as above, PAS of the invention has a residual alkali metal content of at most 100 ppm, preferably at most 50 ppm, more preferably at most 30 ppm. The resin containing few residual alkali metals has a good property of electric insulation, and its value in use, for example, for materials for parts of electric and electronic appliances is extremely high.

The method of producing it is not specifically defined, but the PAS of the invention is preferably produced through purification mentioned below.

2. Purification of PAS (1) First Method of Purification of PAS

The first method of purification of PAS of the invention comprises washing PAS with a mixture of 100 parts by mass of an aprotic organic solvent and from 0.005 to 10 parts by mass, preferably from 0.01 to 5 parts by mass of an alkyl halide.

According to the method, PAS may be purified by washing it with a mixture of 100 parts by mass of an aprotic organic solvent, from 4 to 60 parts by mass, preferably from 5 to 40 parts by mass of water, and from 0.05 to 10 parts by mass, preferably from 0.1 to 5 parts by mass of an alkyl halide.

PAS washed in these methods are thermally stable, and the content of alkali metals that remain therein in the process of producing it can be reduced.

If the ratio of the alkyl halide in the mixture to be used for washing PAS is smaller than 0.005 parts by mass relative to 100 parts by mass of the aprotic organic solvent in the mixture, the washing effect will be unsatisfactory; but even if larger than 10 parts by mass, any further increase in the washing effect could not be expected.

In case where the mixture for washing the resin contains water, if the water content of the mixture is smaller than 4 parts by mass, the washing effect will be unsatisfactory; and if larger than 60 parts by mass, PAS will precipitate and will be difficult to wash. The method of washing PAS with the mixture is not specifically defined, and may be effected in any ordinary manner. Preferably, the washing is repeated at a temperature falling between 150 and 300° C., more preferably between 240 and 270° C. The relatively high temperature washing is not only for promoting the neutralization of excess alkali with the alkyl halide to wash PAS but also for promoting the alkylation of the terminal SH group in PAS with it to thereby retard thermal degradation of PAS. Accordingly, the PAS purified by the method is thermally stable and contains few alkali metals.

The washing frequency may be suitably determined depending on the amount of the residual alkali halide in the system.

PAS, the aprotic organic solvent, the alkyl halide and water are described below.

<1> PAS

PAS to which the invention is directed is not specifically defined. Concretely, it is a polymer having at least 70 mol % of repetitive units of a structural formula —Ar—S— (in which Ar indicates an arylene group). Its one typical example is PPS having at least 70 mol % of repetitive units of the following structural formula (I):

(I)

wherein $R^1$ indicates a substituent selected from an alkyl or alkoxy group having at most 6 carbon atoms, a phenyl group, a carboxyl group or its metal salts, an amino group, a nitro group, or a halogen atom including fluorine, chlorine and bromine atoms; m indicates an integer of from 0 to 4; and n indicates a mean degree of polymerization, falling between 10 and 200.

Depending on its production method, PAS is known to include those having a substantially linear structure not having a branched or crosslinked structure, and those having a branched or crosslinked structure. The invention is effective to any type of such PAS. Concretely, PAS includes homopolymers and copolymers having at least 70 mol %, preferably at least 80 mol % of repetitive paraphenylene sulfide units. The comonomer units for them include, for example, metaphenylene sulfide units, orthophenylene sulfide units, p,p'-diphenyleneketone sulfide units, p,p'-diphenylenesulfone sulfide units, p,p'-biphenylene sulfide units, p,p'-diphenylene-ether sulfide units, p,p'-diphenylenemethylene sulfide units, p,p'-diphenylenecumenyl sulfide units, and naphthyl sulfide units. The polyarylene sulfide to which the invention is directed further includes, in addition to the substantially linear polymers mentioned above, branched or crosslinked polyarylene sulfides produced through copolymerization with a minor comonomer having at least three functional groups as a part of the monomer component, and also polymer mixtures prepared by adding them to the above-mentioned linear polymers.

PAS of those types may be produced in any methods, for example, through polycondensation of a dihalogenoaromatic compound with a sulfur source in an organic polar solvent in a per-se known manner.

PAS which is more effective in the invention is produced, for example, by putting a liquid or gaseous sulfur compound into a lithium hydroxide-containing, aprotic solvent to thereby make the sulfur compound directly react with lithium hydroxide, followed by further putting a dihalogenoaromatic compound into the reaction mixture to polycondensate them, and separating the thus-produced polymer PAS through centrifugation or filtration. In the method of producing the PAS, the reaction of lithium hydroxide with the sulfur compound is effected in a ratio, Li/S of at least 2 (by mol). The PAS thus produced in that condition is, after separated from the polycondensation system through centrifugation or filtration, washed with an organic solvent or water. However, since it is produced under the condition of excess lithium, impurities such as lithium halides could not be completely removed from it even though it is washed in that manner.

Preferred examples of PAS are polyphenylene sulfides of the following structural formula (II) (these will be hereinunder referred to as PPS).

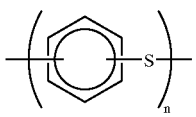
(II)

wherein n has the same meaning as that in formula (I).

<2> Aprotic Organic Solvent

In general, the aprotic organic solvent for use in the invention is preferably a single solvent or a mixed solvent of aprotic polar organic compounds (e.g., amide compounds, lactam compounds, urea compounds, organic sulfur compounds, cyclic organic phosphorus compounds).

Of the aprotic polar organic compounds, amide compounds include, for example, N,N-dimethylformamide, N,N-diethylformamide, N,N-dimethylacetamide, N,N-diethylacetamide, N,N-dipropylacetamide, N,N-dimethylbenzamide.

Lactam compounds include, for example, N-alkylcaprolactams such as caprolactam, N-methylcaprolactam, N-ethylcaprolactam, N-isopropylcaprolactam, N-isobutylcaprolactam, N-n-propylcaprolactam, N-n-butylcaprolactam, N-cyclohexylcaprolactam; and N-methyl-2-pyrrolidone (NMP), N-ethyl-2-pyrrolidone, N-isopropyl-2-pyrrolidone, N-isobutyl-2-pyrrolidone, N-n-propyl-2-pyrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-metyl-2-piperidone, N-ethyl-2-piperidone, N-isopropyl-2-piperidone, N-methyl-6-methyl-2-piperidone, N-methyl-3-ethyl-2-piperidone.

Urea compounds include, for example, tetramethylurea, N,N'-dimethylethyleneurea, N,N'-dimethylpropyleneurea.

Organic sulfur compounds include, for example, dimethyl sulfoxide, diethyl sulfoxide, diphenyl sulfone, 1-methyl-1-oxosulforan, 1-ethyl-1-oxosulforan, 1-phenyl-1-oxosulforan; and cyclic organic phosphorus compounds include, for example, 1-methyl-1-oxophosphoran, 1-n-propyl-1-oxophosphoran, 1-phenyl-1-oxophosphoran.

One or more of these aprotic polar organic compounds may be used either singly or as combined. For the aprotic organic solvent for use herein, they may be combined with any other solvent components not interfering with the object of the invention.

Of the aprotic polar solvents mentioned above, preferred are N-alkylcaprolactams and N-alkylpyrrolidones; and more preferred is N-methyl-2-pyrrolidone.

<3> Alkyl Halides

The alkyl halides for use in the invention may be those of the following general formula (III):

R—Xp (III)

wherein R indicates an alkyl group having from 1 to 10 carbon atoms; X indicates a halogen atom; and p indicates an integer of from 1 to 3. Preferred examples of the alkyl halides are primary alkyl halides such as methyl chloride, methyl iodide, methyl bromide, methyl fluoride, ethyl chloride, ethyl iodide, ethyl bromide, ethyl fluoride, propyl chloride, propyl iodide, propyl bromide, propyl fluoride, butyl chloride, butyl iodide, butyl bromide, butyl fluoride, pentyl chloride, pentyl iodide, pentyl bromide, pentyl fluoride, octyl chloride, octyl iodide, octyl bromide, octyl fluoride, methylene dichloride, methylene diiodide, methylene dibromide; and secondary or tertiary alkyl halides such as isopropyl chloride, isobutyl chloride, tert-butyl chloride. Of those, preferred are primary alkyl halides; and more preferred is methyl chloride. One or more of these may be used either singly or as combined.

<2> Water

Not specifically defined, distilled water is preferred for use in the invention.

(2) Second Method of Purification of PAS

The second method of purification of PAS of the invention comprises washing PAS with a mixture prepared by adding from 0.1 to 10 parts by mass, preferably from 0.3 to 5 parts by mass, relative to 100 parts by mass of PAS, of a halogenoaromatic compound having an electron-withdrawing group to an aprotic organic solvent. The concentration of PAS to be washed according to the method is preferably from 10 to 400 g, more preferably from 50 to 300 g, even more preferably from 100 to 250 g, per liter of the aprotic organic solvent. If the amount of PAS to be washed is larger than 400 g, the washing effect of the method will lower; but if smaller than 10 g, the method is uneconomical.

The method also produces the same effect as that of the first PAS-purifying method.

The second PAS-purifying method will be more effective when PAS is pre-washed with a mixture of an aprotic organic solvent and a salt prepared through reaction of a strong acid with a weak base. Specifically, this embodiment comprises washing PAS with a mixture of 100 parts by mass of an aprotic organic solvent and from 0.005 to 10 parts by mass, preferably from 0.01 to 5 parts by mass of a salt prepared through reaction of a strong acid with a weak base, followed by further washing it with a mixture prepared by adding from 0.1 to 10 parts by mass, preferably from 0.3 to 5 parts by mass, relative to 100 parts by mass of PAS, of a halogenoaromatic compound having an electron-withdrawing group to an aprotic organic solvent.

The mixture to be used in the pre-washing stage may contain water, and it may be comprised of 100 parts by mass of an aprotic organic solvent, from 4 to 60 parts by mass, preferably from 5 to 40 parts by mass of water, and from 0.005 to 10 parts by mass, preferably from 0.01 to 5 parts by mass of a salt prepared through reaction of a strong acid with a weak base.

These methods also produce the same effect as that of the first PAS-purifying method. However, if the amount of the salt prepared through reaction of a strong acid with a weak base to be in the mixture in the pre-washing stage is smaller than 0.005 parts by mass relative to 100 parts by mass of the aprotic organic solvent in the mixture, the washing effect will be unsatisfactory; but even if larger than 10 parts by mass, the washing effect will no more increase economically. On the other hand, if the amount of the halogenoaromatic compound having an electron-withdrawing group to be used in the latter stage of washing is smaller than 0.1 parts by mass relative to 100 parts by mass of PAS to be washed therein, the washing efficiency is poor and the thermal stability of the washed PAS will be low; but even if larger than 10 parts by mass, the washing effect will no more increase economically.

The washing temperature in these methods is not also specifically defined, for which the same as that mentioned hereinabove for the first PAS-purifying method is referred to.

The halogenoaromatic compound having an electron-withdrawing group, and the salt to be prepared through reaction of a strong acid with a weak base, which are used in these methods, are described below. PAS and the aprotic organic solvent for the methods are the same as those mentioned hereinabove for the first PAS-purifying method.

<1> Halogenoaromatic Compound Having Electron-withdrawing Group

The electron-withdrawing group in the compound includes those having any of a sulfone group (—$SO_2$—), a sulfonic acid group (—$SO_3R$), a carbonyl group (—CO—), a carboxyl group (—COOR), a cyano group (—CN—), and a nitro group (—NO$_2$—). In these, R indicates a hydrogen atom, a hydrocarbon group or an alkali metal. Preferably, the hydrocarbon group is an alkyl or aryl group having from 1 to 10 carbon atoms.

Preferred examples of the halogenoaromatic compound having an electron-withdrawing group are 4,4'-dichlorobenzophenone, 4,4'-dichlorodiphenyl sulfone, p-nitrochlorobenzene, m-nitrochlorobenzene, o-nitrochlorobenzene, p-nitrobromobenzene, m-nitrobromobenzene, o-nitrobromobenzene, 4-chlorobenzonitrile, 2-chlorobenzonitrile. Of those, preferred are 4,4'-dichlorobenzophenone and 4,4'-dichlorodiphenyl sulfone. One or more of these halogenoaromatic compounds having an electron-withdrawing group may be used either singly or as combined.

<2> Salt Prepared Through Reaction of Strong Acid with Weak Base

For example, the salt may be prepared through reaction of an acid having a small dissociation index pKa, preferably pKa≦3, such as hydrochloric acid or sulfuric acid, with a base having a large dissociation index pKb, preferably pKb≧8, such as ammonia; and it includes, for example, ammonium chloride, phosphonium chloride or sulfonium chloride. Preferably, the salt is ammonium chloride. One or more of these salts may be used either singly or as combined.

The invention is described more concretely with reference to the following Examples.

PRODUCTION EXAMPLE
[Production of Polyarylene Sulfide]

3326.4 g (33.6 mols) of N-methyl-2-pyrrolidone and 287.4 g (12 mols) of lithium hydroxide were fed into a 10-liter stainless autoclave equipped with a blade stirrer, and heated up to 130° C. After thus heated, hydrogen sulfide was introduced into the liquid at a flow rate of 3 liters/min for 2 hours to synthesize lithium hydrosulfide.

Subsequently, the reaction system was further heated in a nitrogen flow (200 ml/min) introduced thereinto, and a part of hydrogen sulfide formed was removed. With the temperature elevation, water having been formed as a side product in the formation of lithium sulfide begun to evaporate. The side-produced water was condensed in a condenser and taken out of the system. With the removal of water, the temperature of the reaction system further rose, and when it reached 180° C., heating the system was stopped and the temperature of the reaction system was kept constant. After 2 hours, producing lithium sulfide was terminated. Lithium sulfide thus formed precipitated as a solid in the solvent.

With stirring, the slurry was collected, and the concentration of lithium sulfide therein was measured. The sulfur concentration in the slurry was measured through iodometry; and the lithium concentration therein was through ion chromatography. The analysis gave a result of S/Li=0.498 (mol/mol).

Subsequently, 882.0 (6 mols) of paradichlorobenzene (PDCB) and 34.5 g (1.5 mols) of lithium hydroxide were fed into the autoclave, heated up to 220° C., and prepolymerized for 2 hours. Next, this was further heated up to 260° C., and polymerized for 3 hours. After thus polymerized, the reaction mixture was cooled to 100° C. or lower, and taken out of the autoclave. The polymer thus produced was granular, and this was separated from the reaction mixture through a 60-mesh sieve. The polymer with the reaction mixture adhering thereto (crude polymer A) was washed as in the washing tests mentioned below.

When the crude polymer A obtained herein was repeatedly washed with water and acetone and dried, its mass reduced to about 50% of the its original mass, and its intrinsic viscosity [η] was 0.28 dl/g.

Example 1

100 g of the crude polymer A, 250 g of NMP and 2.5 g of methyl chloride were put into a 1-liter autoclave, and stirred at 260° C. for 1 hour to wash the polymer. After cooled, the polymer was separated through a 60-mesh sieve. Next, the above washing operation was repeated three times with no addition of methyl chloride to the system, and a pure PAS was obtained. The PAS was analyzed for the residual Li therein, and tested for its thermal stability. The results are given in Table 1.

The method of measuring the residual Li in PAS, and the method of testing PAS for thermal stability are mentioned below.

Method of Measuring Residual Li in PAS

One g of PAS was sampled, dried under reduced pressure at 200° C. for one full day, and then fired and ashed in a muffle furnace at 600° C. for 10 hours. The ash was analyzed through atomic absorption spectroscopy to determine the Li content of the sample.

Test Method for Thermal Stability 2.5 g of PAS and 2.5 g of NMP were put into a small pressure cell (made of SUS316) having a volume of 10 ml, and sealed up. The cell was heated up to 265° C. in an oil bath, and kept at the temperature for 8 hours. With that, the cell was taken out of the bath and cooled, and PAS was taken out of the cell, washed with water and dried. The intrinsic viscosity [η] of the thus-processed PAS was measured according to the method mentioned below.

Measurement of Intrinsic Viscosity 0.04±0.001 g of the sample was dissolved in 10 ml of α-chloronaphthalene at 235° C. within 15 minutes. The viscosity of the solution in a thermostat at 206° C., and its relative viscosity to the viscosity of α-chloronaphthalene alone not containing the polymer were measured. From the data, the intrinsic viscosity [η] of the polymer was obtained according to the formula mentioned below. [η] (dl/g)=ln (relative viscosity)/polymer concentration.

Example 2

The crude polymer A was washed in the same manner as in Example 1, except that 7.5 g of methyl chloride was used herein. Thus washed, PAS was analyzed for the residual Li therein, and tested for its thermal stability. The results are given in Table 1.

Example 3

The crude polymer A was washed in the same manner as in Example 1, except that 220 g of NMP and 30 g of water were used herein in place of 250 g of NMP in Example 1. Thus washed, PAS was analyzed for the residual Li therein, and tested for its thermal stability. The results are given in Table 1.

Example 4

100 g of the crude polymer A, 250 g of NMP and 2.5 g of ammonium chloride were put into a 1-liter autoclave, and stirred at 260° C. for 1 hour to wash the polymer. After cooled, the polymer was separated through a 60-mesh sieve. Next, in place of ammonium chloride, 0.5 parts by mass, relative to 100 parts by mass of PAS, of 4,4'-dichlorodiphenyl sulfone was added to the system, and the same washing operation as above was repeated three times. Thus washed, PAS was analyzed for the residual Li therein, and tested for its thermal stability. The results are given in Table 1.

Example 5

The crude polymer A was washed in the same manner as in Example 4, except that 5 parts by mass of 4,4'-dichlorodiphenyl sulfone was used herein. Thus washed, PAS was analyzed for the residual Li therein, and tested for its thermal stability. The results are given in Table 1.

Example 6

The crude polymer A was washed in the same manner as in Example 4, except that 0.5 parts by mass of 4,4'-dichlorobenzophenone was used herein in place of 0.5 parts by mass of 4,4'-dichlorodiphenyl sulfone in Example 4. Thus washed, PAS was analyzed for the residual Li therein, and tested for its thermal stability. The results are given in Table 1.

Example 7

The crude polymer A was washed in the same manner as in Example 6, except that 5 parts by mass of 4,4'-dichlorobenzophenone was used herein. Thus washed, PAS was analyzed for the residual Li therein, and tested for its thermal stability. The results are given in Table 1.

Comparative Example 1

The crude polymer A was washed in the same manner as in Example 1, except that 2.5 g of methyl chloride was not used herein. Thus washed, PAS was analyzed for the residual Li therein, and tested for its thermal stability. The results are given in Table 1.

Comparative Example 2

The crude polymer A was washed in the same manner as in Example 1, except that 2.5 g of ammonium chloride was used herein in place of 2.5 g of methyl chloride in Example 1. Thus washed, PAS was analyzed for the residual Li therein, and tested for its thermal stability. The results are given in Table 1.

TABLE 1

|  | Amount of Residual Li (ppm) | Result of Thermal Stability Test | |
| --- | --- | --- | --- |
|  |  | Intrinsic Viscosity [η] | Reduction in [η] |
| Example 1 | 13 | 0.27 | 0.01 |
| Example 2 | 7 | 0.24 | 0.04 |
| Example 3 | 12 | 0.26 | 0.02 |
| Example 4 | 6 | 0.26 | 0.02 |
| Example 5 | 6 | 0.28 | 0 |
| Example 6 | 6 | 0.27 | 0.01 |
| Example 7 | 6 | 0.27 | 0.01 |
| Comp. Ex. 1 | 1300 | 0.12 | 0.16 |
| Comp. Ex. 2 | 10 | 0.15 | 0.13 |

(Note) The unit of the intrinsic viscosity [η] in the Table is dl/g.

Industrial Applicability

According to the invention described as above, PAS having a high molecular weight and produced to a high degree of conversion can be well washed to efficiently remove the impurities, especially alkali metal halides from it, and the thus-washed PAS is thermally stable.

What is claimed is:

1. A polyarylene sulfide, which is characterized in that, when it is added to a solvent N-methyl-2-pyrrolidone of the same quantity (by mass) and kept at 265° C. for 8 hours, the reduction in its intrinsic viscosity [η] at 206° C. is at most 0.05 dl/g, and of which the residual alkali metal content is at most 100 ppm.

2. A method of purifying a polyarylene sulfide comprising washing the polyaryene sulfide with a mixture of 100 parts by mass of an aprotic organic solvent and from 0.005 to 10 parts by mass of an alkyl halide.

3. A method of purifying a polyarylene sulfide comprising washing the polyarylene sulfide with a mixture of 100 parts by mass of an aprotic organic solvent, from 4 to 60 parts by mass of water, and from 0.05 to 10 parts by mass of an alkyl halide.

4. The method of purifying a polyarylene sulfide as claimed in claim 2, wherein the alkyl halide is a primary alkyl halide.

5. The method of purifying a polyarylene sulfide as claimed in claim 2, wherein the alkyl halide is methyl chloride.

6. A method of purifying a polyarylene sulfide comprising washing the polyarylene sulfide with a mixture of 100 parts by mass of an aprotic organic solvent and from 0.005 to 10 parts by mass of a salt prepared through reaction of a strong acid with a weak base, followed by further washing the polyarylene sulfide with a mixture prepared by adding from 0.1 to 10 parts by mass, relative to 100 parts by mass of the polyarylene sulfide, of a halogenoaromatic compound having an electron-withdrawing group to an aprotic organic solvent.

7. A method of purifying a polyarylene sulfide comprising washing the polyarylene sulfide with a mixture of 100 parts by mass of an aprotic organic solvent, from 4 to 60 parts by mass of water, and from 0.005 to 10 parts by mass of a salt prepared through reaction of a strong acid with a weak base, followed by further washing the polyarylene sulfide with a mixture prepared by adding from 0.1 to 10 parts by mass, relative to 100 parts by mass of the polyarylene sulfide, of a halogenoaromatic compound having an electron-withdrawing group to an aprotic organic solvent.

8. The method of purifying a polyarylene sulfide as claimed in claim 3, wherein the alkyl halide is a primary alkyl halide.

9. The method of purifying a polyarylene sulfide as claimed in claim 3, wherein the alkyl halide is methyl chloride.

10. The method of purifying a polyarylene sulfide as claimed in claim 6, wherein the halogenoaromatic compound having an electron-withdrawing group is at least one of 4,4'-dichlorobenzophenone and 4,4'-dichlorodiphenyl sulfone.

11. The method of purifying a polyarylene sulfide as claimed in claim 7, wherein the halogenoaromatic compound having an electron-withdrawing group is at least one of 4,4'-dichlorobenzophenone and 4,4'-dichlorodiphenyl sulfone.

12. The polyarylene sulfide as claimed in claim 1, wherein the reduction in intrinsic viscosity is at most 0.03 dl/g.

13. The polyarylene sulfide as claimed in claim 12, wherein the reduction in intrinsic viscosity is at most 0.02 dl/g.

14. The method of purifying a polyarylene sulfide as claimed in claim 2, wherein the polyarylene sulfide which is purified has been obtained using a lithium compound.

15. The method of purifying a polyarylene sulfide as claimed in claim 3, wherein the polyarylene sulfide which is purified has been obtained using a lithium compound.

16. The method of purifying a polyarylene sulfide as claimed in claim 6, wherein the polyarylene sulfide which is purified has been obtained using a lithium compound.

17. The method of purifying a polyarylene sulfide as claimed in claim 7, wherein the polyarylene sulfide which is purified has been obtained using a lithium compound.

* * * * *